United States Patent [19]

Aoyama et al.

[11] Patent Number: 4,814,124

[45] Date of Patent: Mar. 21, 1989

[54] PREPARATION OF GAS PERMEABLE POROUS FILM

[75] Inventors: Mari Aoyama, Okazaki; Michiyasu Ito, Kuwana; Syoichi Tsuji, Nagoya; Toshiyuki Ishii, Kasugai; Tomohide Tanaka, Nagoya, all of Japan

[73] Assignee: Mitsui Toatsu Chemicals Inc., Tokyo, Japan

[21] Appl. No.: 5,099

[22] Filed: Jan. 20, 1987

[30] Foreign Application Priority Data

Jan. 21, 1986 [JP] Japan .................................. 61-8888
May 28, 1986 [JP] Japan .............................. 61-121300
Dec. 26, 1986 [JP] Japan .............................. 61-308723
Dec. 26, 1986 [JP] Japan .............................. 61-308724

[51] Int. Cl.$^4$ ...................... B29C 55/02; B29C 67/20
[52] U.S. Cl. .................................. 264/41; 264/210.6; 264/210.7; 264/284; 264/288.8; 264/289.6; 264/DIG. 47
[58] Field of Search ............... 264/DIG. 47, 41, 284, 264/210.6, 210.7, 288.8, 289.6

[56] References Cited

U.S. PATENT DOCUMENTS 3,407,253 10/1968 Yoshimura et al. .
3,679,538 7/1972 Orwin et al. ........................ 264/41
3,758,661 9/1973 Yamamoto et al. ............... 264/284
3,765,999 10/1973 Toyoda ....................... 264/DIG. 47
3,903,234 9/1975 Ikeda et al. ................. 264/DIG. 47
4,255,376 3/1981 Soehngen ................... 264/DIG. 47
4,613,643 9/1986 Nakamura ................. 264/DIG. 47

FOREIGN PATENT DOCUMENTS 2074338 10/1971 France .
030856 3/1976 Japan .
2151538 7/1985 United Kingdom .

Primary Examiner—James Lowe
Attorney, Agent, or Firm—Schmeiser, Morelle & Watts

[57] ABSTRACT

A gas permeable porous film which is prepared by stretching a film made from a mixture containing a polyolefin resin and an inorganic filler at least uniaxially and possesses a rugged pattern on its surface. One process for producing the film comprises forming the aforesaid mixture into a film, providing on the surface of the film a rugged pattern, stretching the resulting film at least uniaxially, and forming on the stretched film thus-formed a rugged pattern by means of a heated emboss roll and simultaneously allowing the stretched film to contract.

4 Claims, No Drawings

PREPARATION OF GAS PERMEABLE POROUS FILM

BACKGROUND OF THE INVENTION

This invention relates to a gas-permeable porous film provided with a pattern formed by disposing regularly elevations and depressions (this patern is hereinafter referred to as a rugged pattern) on its surface and a preparation process thereof.

Conventionally, it has been known to prepare a porous film by blending inorganic fine powder with a polyolefin resin in specific proportions, melting and forming the resulting composition into a film, and stretching the film at least uniaxially (Japanese Patent Publication No. 12542/1978 and Japanese Patent Laid-Open Nos. 99242/1981 and 59727/1982).

Although the porous films obtained by these processes had for their function a gas permeability, they failed to appeal their moisture-permeability to the visual sense and thus lacked an appeal to consumers of their gas-permeability. They were devoid of a depth in appearance and hence looked cheapish and strength-lacking. In addition, the films involved such drawbacks that upon touching them, the skin felt a coldness specific to the films made of resins and in some cases a surface tackiness.

With the aim of improving these processes, it has been proposed to subject a film containing an inorganic filler simply to an embossing treatment (Japanese Patent Laid-Open Nos. 30856/1976 and 80450/1985). The process disclosed in Japanese Patent Laid-Open No. 30856/1976 has a disadvantage that when a film is embossed to such an extent that a sufficient gas permeability is imparted thereto, the film may break and inevitably have large holes partially evolved. Further, in the process of Japanese Patent Laid-Open No. 80450/1985, no patterns with satisfactory elevations and depressions (elevations and depressions are hereinafter referred to as ruggedness) are formed on the film.

The porosity of a porous film containing a filler is generally dependent on the amount of the filler used, its particle size, stretching ratio and similar factors. Pores are formed by stretching a film at a stretching ratio of 2.0 times or more in one direction. However, in order to attain a sufficient porosity through uniform pore distribution, it is necessary to use a stretching ratio as high as 4 times or more. Accordingly, the porous films obtained by the conventional processes have disadvantages in mechanical strength, for example, low tear strength in the stretching direction for those obtained by uniaxial stretching and weakness in surface strength for those from biaxial stretching.

The porous films obtained at a low stretching ratio have sufficient tear strength. However, at a low stretching ratio, uniform stretching is hardly brought about and stretching irregularities are liable to occur, with the result that the films thus-formed are extremely poor looking and have degraded values as a product. In addition, gas-permeability of the resulting porous films is so uneven that the films are regarded as unfavorable from a functional viewpoint.

SUMMARY OF THE INVENTION

An object of the present invention is to provide an improved porous polyolefin film.

Another object of the present invention is to provide a porous film which has a sufficient gas-permeability, is capable of appealing its moisture-permeability to the visual sense and possesses substantial mechanical strengths.

A further object of the present invention is to provide a porous film which has a depth in appearance and a feeling to the touch as of cotton and hemp.

A still further object of the present invention is to provide a process according to which such a film can be prepared.

Other objects of the present invention will be obvious from the description hereinafter disclosed.

The porous film of the present invention is a gas permeable porous film which is formed by stretching at least uniaxially a film prepared from a mixture containing a polyolefin resin and an inorganic filler and has a rugged pattern on its surface.

The porous film of the present invention can find applications in the field of water proof clothing, rain-tight covers, sanitary materials, packaging materials and similar materials.

DETAILED DESCRIPTION OF THE INVENTION

Exemplary polyolefin resins useful in the process of the present invention may include homopolymers such as polypropylene, low-density polyethylene, linear low-density polyethylene, high-density polyethylene and polybutylene, copolymers such as ethylenepropylene copolymer and ethylene-vinyl acetate copolymer, or blends of these polymers. Particularly preferred is polypropylene, low-density polyethylene, linear low-density polyethylene or high-density polyethylene, or a mixture of two or more of these polymers.

As exemplary inorganic fillers may be mentioned calcium carbonate, talc, clay, kaolin, silica, diatomaceous earth, magnesium carbonate, barium carbonate, magnesium sulfate, barium sulfate, calcium sulfate, aluminum hydroxide, magnesium hydroxide, calcium oxide, magnesium oxide, zinc oxide, titanium oxide, alumina, mica, glass powder, sirasu balloon (a vulcanic ash enlarged), zeolite and acid clay. Among others, calcium carbonate and barium sulfate are particularly preferred. These fillers may be used either singly or in combination. The average particle size of the inorganic filler (according to ASTM C-721-76) may favorably be 30 $\mu$m or smaller, with a size of 0.5–5.0 $\mu$m being particularly preferred.

The amount of the inorganic filler to be added should be such a sufficient amount as to attain a desired porosity, though depending to some extent on the kind and particle size of the inorganic filler. The preferred amount of the inorganic filler to be added may be 50–500 parts by weight and particularly 100–400 parts by weight based on 100 parts by weight of the polyolefin resin. If the filler is added to the resin in amounts less than 50 parts by weight, sufficient porosity may not be brought about in the film. Any amounts added in excess of 500 parts by weight will increase the rigidity of the resulting film and decrease its stretchability and thus lead to failure in sufficient stretching and to lowered porosity.

It is preferable to carry out the surface treatment of the filler in view of the dispersibility thereof into the resin and the stretchability of the film resulting from the resin composition. As the surface treating agent may be used fatty acids or metal salts thereof, silicone, silane, resin acids, etc.

The film-forming mixture containing the polyolefin resin and filler may properly be added, as required, with other additives such as a lubricant, pigment, stabilizer for heat and light, plasticizer, and antistatic agent.

As regards the rugged pattern in accordance with the present invention, it is appropriate to provide a pattern having a surface depth (a depth of the lowest portion of the depression based on the highest portion of the elevation) of 2 $\mu$m or more and particularly of 2 $\mu$m–3 mm. Although depending on the thickness of the film, when the ruggedness has a depth of less than 2 $\mu$m, it approaches a ruggedness originating from the irregularity of thickness which ordinary films have so that the rugged pattern of the film can hardly be distinguished therefrom. Further, the ruggedness of more than 3 mm will cause the properties of the resulting film to degrade extremely and, in the case of a thin film, make it impossible to provide a rugged pattern on its surface. The intended appearance and feeling to the touch can be obtained only by providing on the surface of a film a rugged pattern having a depth of 2 $\mu$m or more.

The moisture-permeability (measured according to ASTM E 96-66), the index of porosity of the porous film of the present invention, may preferably be 500 g/m².24 hrs. or more, with a value of 1,000 g/m².24 hrs. or more being particularly preferred. Although the circumstance mayvary depending on the use of the resulting films, practically no function can be expected as a gas-permeable film if the moisture-permeability is less than 500 g/m².24 hrs.

The preparation process of the porous film having a rugged pattern on its surface will be described hereunder.

An inorganic filler and a polyolefin resin, added with an adequate amount of other additive as required, are mixed with each other in accordance with any known method. Thereafter, the mixture is kneaded by means of a well-known apparatus such as Bumbury's mixer, mixing roll, single or twin screw extruder or other melt kneader, pelletized or as it is, and formed into a film by means of an ordinary film-forming apparatus in accordance with an ordinary film-forming procedure. In general, it is formed into a film by calendering, casting or extrusion.

Thereafter, the resulting film is imparted with a rugged pattern through an ordinary embossing step or the like and then stretched at least uniaxially, thereby forming a porous film. The stretching may be effected in uniaxial, biaxial or multiaxial directions and in a single stage or multi stages by any ordinary procedure.

The stretching ratio on area basis in the practice of the process of the present invention may preferably be 1.05–50 times, with a ratio of 1.1–20 times being particularly preferred for the purpose of obtaining the intended appearance and sufficient gas-permeability. If the ratio exceeds 50 times, the film tends to be cut by the stretching, thus failing in its stable production. On the other hand, if the ratio is less than 1.05 times, sufficient porosity cannot be expected practically. When uniaxially stretched, the stretching ratio is preferably 1.05–10 times and, more preferably, 1.1–7 times.

The porous film of the present invention can also be prepared by the following process:

The process comprises forming a mixture containing a polyolefin resin and an inorganic filler into a film, embossing the film so as to render its surface rough, stretching the resulting film having a rugged pattern at least uniaxially, and providing on the stretched film thus-formed a rugged pattern by means of a heated emboss roll and simultaneously annealing it.

Upon the annealing, it is also possible to allow the stretched film to shrink. Further, when forming a rugged pattern on the film by a heated emboss roll, it is preferable to stretch the film again at a stretch ratio of 1.03 times or more immediately before the emboss rolling operation so as to make the rugged pattern more distinct.

The temperature of the emboss roll may preferably be in the range of from [Tm−40° C.] to [Tm+20° C.] (Tm =melting temperature of the film).

Although the circumstance may vary depending on the stretching ratio, the shrinkage rate of the stretched film through annealing may properly be 5–50% on area basis, in general. Satin patterns having delustering effects or various rugged patterns for various purposes can be applied to the surface of the roll used in the embossing step for rendering the surface of the film rough.

The film formation, embossing for forming rough surface, stretching and provision of rugged pattern emboss may be effected separately, continuously or partially continuously.

Since the tensile strengths of the stretched film in the machine and transverse directions are recovered from their imbalance by providing the film with a rugged pattern, the porous film of the present invention can also be produced by the following process:

The process comprises forming a mixture containing a polyolefin resin and an inorganic filler into a film, stretching the film at least uniaxially without being provided with a rugged pattern prior to being stretched, and then providing a rugged pattern on the surface of the stretched film by means of a heated emboss roll and simultaneously annealing the film to shrink it, whereby the gas-permeable porous film having the rugged pattern.

The stretching ratio on area basis is preferably 4–50 times and, more preferably, 4–25 times.

The porous film of the present invention can also be prepared by the following process:

The process comprises forming a mixture containing a polyolefin resin and an inorganic filler into a film, forming a striped rugged pattern on the film in its flow direction (machine direction, MD) or in the perpendicular direction thereto (transverse direction, TD), and then stretching the resulting film at least uniaxially, preferably, in the direction perpendicular to the striped rugged pattern.

The striped rugged pattern as described herein is such that a group of long dense rugged lines and a group of long coarse rugged lines are arranged in parallel alternately so that the dense group may be taken visually as a stripe. In the group of long dense rugged lines, the ruggedness may be continuous or discontinuous.

The ratio of the depth (b) of the depression based on the highest portion of the elevation in the striped pattern to the apparent thickness (a) of the porous film (hereinafter referred to as ruggedness depth ratio, b/a) may preferably be 0.2–0.9 and particularly 0.4–0.7. Further, the interval between the center line of the elevations in a striped pattern and that in the neighboring striped pattern may preferably be 50 $\mu$m–2 mm.

If the value of the ruggedness depth ratio is less than 0.2, the ruggedness of the film approaches a ruggedness originating from the irregularity of thickness that ordinary films have, so that no practical effects can be expected in the improvement of the mechanical properties of the film. Any values in excess of 0.9 will lead to an extreme deterioration of the properties of the resulting film or may be responsible for the breakage of the film upon stretching, thus leading to the failure in forming any adequate film at times.

If the interval between two neighboring striped patterns is less than 50 μm, embosses are hardly applied on the film so that stretching irregularities are liable to occur. Thus, no effects of improvement is obtained. If the interval exceeds 2 mm, flat portions of the film will be too wide to expect the improvements in mechanical properties, depth in appearance, and surface tackiness.

The film on the surface of which a striped pattern is formed as described above should be stretched at least in the flow direction of the film or in the direction perpendicular to the flow direction thereof. The stretching ratio may preferably be 1.05–25 times in terms of area. If the ratio exceeds 25 times, the intended mechanical strength cannot be obtained and the film is cut by the stretching, resulting in occasional difficulty in its stable production. If the ratio is less than 1.05 times, sufficient porosity can scarcely be expected.

The aforesaid film formation, embossing and streching may be effected separately, continuously or partially continuously. Further, after the stretching, as described above, the film may be provided with a rugged pattern again by means of a heated emboss roll and simultaneously annealed, as occasion demands. It is possible to anneal the film and allow it to shrink at the same time. It is more preferable to allow the film to shrink.

The porous film according to the present invention has a sufficient gas-permeability and moreover possesses a rugged pattern on its surface so that it is capable of appealing its moisture-permeability to the visual sense. Therefore, it can appeal its gas-permeability to consumers to a sufficient degree. Further, it has a depth in appearance so that it can give an impression of being high grade and strong and as well as a soft feeling to the touch.

In order to provide a film with sufficient porosity through uniform pore distribution, it has so far been necessary to stretch the film more than 4 times in one direction as well as to select its filler properly. According to the preparation process of the present invention, it is possible to provide a film with sufficient porosity by stretching it at a stretching ratio of less than 4 times and particularly as low as about 2 times even in the case of stretching in one direction. As a result, the degradation of tear strength in the stretching direction is so minimized even in uniaxial stretching that it becomes possible to obtain a mechanically excellent porous film. In spite of being formed at a low stretch ratio, the film has no stretching irregularities, is free from the breakage upon stretching because of the low stretching ratio, and is excellent in production stability. Since simple apparatus will suffice for attaining the purpose, its operation and maintenance will be also easy.

A porous film with excellent mechanical properties such as strong surface strength can be obtained by either of simultaneous or successive biaxial stretching, as is the case with uniaxial stretching. The reason why sufficient porosity is achieved by the stretching at such a low ratio is assumed that the application of a rugged pattern enables the film to form a portion to which stresses are liable to concentrate and this rugged portion is being stretched selectively at a higher stretching ratio than the surrounding portion.

By choosing the size, shape, and the like of a rugged pattern properly, it is possible to provide a film with a desired gas-permeability and the addition, the light and shade of the pattern is made distinct when the film is colored with the aid of a pigment used as an additive, so that a porous film with better appearance can be obtained. The rugged pattern may also vary in shade, depth of the ruggedness, and the like by changing the stretching ratio, thereby permitting a widespread use of the resulting film.

Further, it becomes possible to appeal its moisture-permeability to the visual sense by providing the stretched film with a rugged pattern by means of a heated emboss roll and simultaneously allowing it to contract through annealing, subsequent to the stretching. The depth in appearance also makes it possible to impart to the film an impression of being high-grade and tough. Further, the porous film thus obtained has better appearance and excellent feeling to the touch and causes a lesser extent of shrinkage, so that it can find a wide variety of application.

In the case of forming a striped rugged pattern, the portion stretched at a lower ratio than the surrounding portion is distributed evenly in the direction perpendicular or parallel to the flow direction of the film. Accordingly, when the stretching direction coincides with the flow direction of the film, the tear strength in the stretching direction and the tensile strength in the direction perpendicular to the stretching direction of the film are superior to those of conventional porous films. Further, when the stretching direction is perpendicular to the flow direction of the film, the tensile strength in the flow direction of the film is also superior to that of conventional porous films. Furthermore, since it is possible to obtain a porous film which is excellent in appearance and feeling to the touch, has a depth in appearance and possesses sufficient practical strength, the film can readily be expanded in its application.

The present invention will be described more specifically with reference to the following examples. The physical properties in each of the examples were measured by the following methods.

(1) Tensile Breakage Test (kg)

Using a tensile strength testing machine, a piece of film measuring 25 mm (width)×100 mm (length) is tested at a grip separation of 200 mm/min. Its strength at breakage is determined with respect to the machine direction (MD; the flow direction) and the transverse direction (TD; the direction perpendicular to the flow direction).

(2) Tear Strength (g)

A cut having a length of about 50 mm is provided inwardly from the center of a short side of a test piece measuring 10 mm (width)×100 mm (length) and parallel to its long sides. The both sides of the cut are fixed to a tensile strength testing machine, one for backwise and the other for forthwise, and tear tests are conducted at a grip separation rate of 200 mm/min. to determine an average load at breakage. The test piece is prepared in such a manner that the direction of its long sides coincides with the stretching direction of the film.

(3) Moisture-permeability

Moisture-permeability is tested according to ASTM E-96-66.

(4) Depth of Rugged Pattern and Its Interval

The depth is measured with a cat whisker having a tip radius of 5 μm using a surface roughness meter (a product of Tokyo Seimitsu Co.). The measurement is conducted in accordance with ISO R1880.

(5) Stiffness (mm)

Samples are prepared by winding a film measuring 200 mm of width (MD) and 300 mm of length (TD) four times round a steel sheet measuring 25 mm of width, 300 mm of length and 1 mm of thickness in a pile and then drawing the steel sheet out of the pile. Stiffness is tested according to JIS L-1018 Stiffness Test Method A.

(6) Thermal Shrinkage Rate (%)

This rate is measured according to JIS K-6734 Thermal Shrinkage Test, except that test pieces are placed for 15 minutes in a testing machine of hot air circulation type kept at 80° C.±2° C. and the measurement is made only in the flow direction of the film.

(7) Coefficient of Static Friction (than 8)

Angle of inclination at which a sample begins to slip is measured using a static friction meter (a product of Toyo Seiki Co.).

EXAMPLE 1

Run Nos. 1-9

In each run; 100 parts by weight of linear low-density polyethylene (L-LDPE) with MI (meltflow index)=2 and precipitated barium sulfate (average particle size according to ASTM C-721-76: 0.8 μm, Run Nos. 1-5) or calcium carbonate (average particle size: 0.8 μm, Run Nos. 6-9) as an inorganic filler were mixed in a Henschel mixer. The resulting mixture was pelletized and then formed into a film through extrusion by a sheet molder. Thereafter, the film was pinched and embossed by an emboss roll (26° C.) and a rubber roll having a rubber hardness of 70° at a nip pressure of 10 kg/cm. Subsequently, the resulting film was roll stretched uniaxially at a stretching ratio of 1.1-7.0 times to obtain a porous emboss film with a grammage of 35 g/m². Measurements of the stretch ratio and properties of the resulting film are shown in Table 1. Determination of MI was carried out in accordance with ASTM D-1238-79 (190° C., 2.160 kg load).

Run Nos. 10-12

In each run; a mixture of the same L-LDPE as used in Run No. 1 and low-density polyethylene with MI=5 (LDPE; Run No. 10), high-density polyethylene with MI=9 (HDPE; Run No. 11), or poly propylene with MI=1.5 (PP; Run No. 12) and precipitated barium sulfate in the amounts given in Table 1 were treated in the same manner as in Run No. 1 and at a stretching ratio of 2.0 times to obtain a porous emboss film. Evaluations of the resulting film are shown in Table 1. MI of polypropylene was measured according to ASTM D-1238-79 (230° C., 2.160 kg load).

Run Nos. 13 and 14

In each run; L-LDPE and precipitated barium sulfate in the amounts given in Table 1 were treated in the same manner as in Run No. 1 and at a stretching ratio of 2.0 times to obtain a porous emboss film. Evaluations of the resulting film are shown in Table 1.

Run No. 15

Using the same raw materials as in Run No. 1 and at a biaxial stretching ratio of 2.0×2.0 times, a porous emboss film was obtained. Evaluations of the resulting film are shown in Table 1.

Run Nos. 16-20

In each run; the same L-LDPE as in Run No. 1 and an inorganic filler (precipitated barium sulfate; Run Nos. 16, 18-20: calcium carbonate; Run No. 17) in the amounts given in Table 1 were treated in the same manner as in Run No. 1 and at the stretching ratio given in Table 1 to obtain a porous emboss film. Evaluations of the resulting film are shown in Table 1. The resulting film had no gas permeability in Run Nos. 16, 17 and 19 and no stable production was attained due to the breakage upon stretching in Run Nos. 18 and 20.

Run Nos. 21-26

In each run; the same resin composition as used in Run No. 1 was formed into a film. The resulting film was stretched at the stretch ratio given in Table 1 without being embossed in advance to obtain a film with a grammage of 35 g/m². Evaluations of the resulting film are shown in Table 1. The film had practically no gas-permeability in Run Nos. 21 and 22. The film was very poor-looking due to stretching irregularities in Run Nos. 22 and 23. Further, tear strength was very small for all the films of Run Nos. 23-26.

TABLE 1

| Run No. | Raw Material Resin parts by weight | Raw Material Inorganic Filler parts by weight | Embossing Condition Rubber Hardness degree | Embossing Condition Nip pressure (Kg/cm) | Embossing Condition Emboss Roll Temperature (°C.) | Depth of Rugged Pattern after stretching (μm) | Stretching Ratio (times) | Properties Appearance (*) | Properties Tensile Strength (Kg/25 mm) MD | Properties Tensile Strength (Kg/25 mm) TD | Properties Tear Strength MD (g) | Properties Water vapor Permeability (g/m² · 24 hrs) |
|---|---|---|---|---|---|---|---|---|---|---|---|---|
| 1 | L-LDPE 100 | BaSO₄ 150 | 70 | 10 | 26 | 120 | 1.1 | ◎ | 1.3 | 1.1 | 85 | 550 |
| 2 | " | " | " | " | " | 50 | 1.2 | ◎ | 1.5 | 1.0 | 80 | 550 |
| 3 | " | " | " | " | " | 20 | 2.0 | ◎ | 2.0 | 0.8 | 55 | 1580 |
| 4 | " | " | " | " | " | 10 | 4.0 | ◎ | 2.8 | 0.7 | 40 | 2500 |
| 5 | " | " | " | " | " | 5 | 7.0 | ○ | 2.9 | 0.5 | 30 | 3000 |
| 6 | " | CaCO₃ 150 | " | " | " | 100 | 1.1 | ◎ | 1.5 | 1.2 | 77 | 650 |
| 7 | " | " | " | " | " | 40 | 1.2 | ◎ | 1.5 | 1.2 | 74 | 830 |
| 8 | " | " | " | " | " | 18 | 2.0 | ◎ | 1.6 | 0.9 | 50 | 1700 |
| 9 | " | " | " | " | " | 8 | 3.0 | ○ | 1.9 | 0.8 | 40 | 2000 |

TABLE 1-continued

| | Raw Material | | Embossing Condition | | | Depth of Rugged Pattern after stretching (μm) | Stretching Ratio (times) | Properties | | | | |
|---|---|---|---|---|---|---|---|---|---|---|---|---|
| | | | Rubber Hardness degree | Nip pressure (Kg/cm) | Emboss Roll Temperature (°C.) | | | Appearance (*) | Tensile Strength (Kg/25 mm) | | Tear Strength MD (g) | Water vapor Permeability (g/m². 24 hrs) |
| Run No. | Resin parts by weight | Inorganic Filler parts by weight | | | | | | | MD | TD | | |
| 10 | L-LDPE80 LDPE20 | BaSO₄ 150 | " | " | " | 25 | 2.0 | ⊚ | 1.9 | 0.8 | 42 | 1300 |
| 11 | HDPE 100 | BaSO₄ 180 | " | " | " | 20 | 2.0 | ⊚ | 2.5 | 1.1 | 40 | 1600 |
| 12 | PP 100 | BaSO₄ 180 | " | " | " | 22 | 2.0 | ○ | 2.5 | 1.0 | 32 | 1500 |
| 13 | L-LDPE 100 | BaSO₄ 60 | " | " | " | 20 | 2.0 | ○ | 3.0 | 1.0 | 80 | 600 |
| 14 | " | BaSO₄ 450 | " | " | " | 20 | 2.0 | ○ | 1.7 | 0.8 | 54 | 1600 |
| 15 | " | BaSO₄ 150 | " | " | " | 10 | 2.0 × 2.0 | ⊚ | 2.3 | 2.2 | 105 | 3800 |
| 16 | " | " | " | " | " | 230 | Unstretched | ○ | 1.2 | 1.2 | 102 | 30 |
| 17 | " | CaCO₃ 150 | " | " | " | 200 | Unstretched | ○ | 1.4 | 1.2 | 96 | 60 |
| 18 | L-LDPE 100 | BaSO₄ 150 | " | " | " | — | 8.0 | * | — | — | — | — |
| 19 | " | BaSO₄ 40 | " | " | " | 15 | 2.0 | Δ | 3.0 | 1.5 | 80 | 50 |
| 20 | " | BaSO₄ 600 | " | " | " | — | 2.0 | * | — | — | — | — |
| 21 | " | BaSO₄ 150 | — | — | — | — | Unstretched | ○ | 1.5 | 1.4 | 90 | 15 |
| 22 | " | " | — | — | — | — | 1.5 | X | — | — | 8 | — |
| 23 | " | " | — | — | — | — | 2.0 | X | — | — | 7 | — |
| 24 | " | " | — | — | — | — | 4.0 | Δ | 3.0 | 0.3 | 5 | 2000 |
| 25 | " | " | — | — | — | — | 7.0 | Δ | 4.5 | 0.3 | 4 | 3300 |
| 26 | " | " | — | — | — | — | 2.0 × 2.0 | Δ | 2.5 | 2.4 | 75 | 3000 |

(*)Appearance
⊚ very good
○ good
Δ poor
X bad (stretching irregularities)
*breakage upon stretching

EXAMPLE 2

Run Nos. 1-5

In each run; 100 parts by weight of linear low-density polyethylene (L-LDPE) with MI=2 and 150 parts by weight of precipitated barium sulfate (average particle size: 0.8 μm, Run Nos. 1-3) or calcium carbonate (average particle size: 0.8 μm, Run Nos. 4-5) as an inorganic filler were mixed in a Henschel mixer. The resulting mixture was pelletized and ten formed into a film through extrusion by a sheet molder. The surface of the film was then rendered rough by a satin pattern. Thereafter, the resulting film was stretched at the stretching ratio given in Table 2 and then pinched and embossed by a heated emboss roll (90° C.) and a rubber roll at a nip pressure of 15 kg/cm to obtain a porous emboss film with a grammage of 50 g/m². The stretching ratio, shrinkage rate of the stretched film through annealing and evaluations of the resulting film are shown in Table 2.

Run Nos. 6-8

In each run; a mixture of the same L-LDPE as used in Run No. 1 and low-density polyethylene (LDPE) with MI=5 (Run No. 6), high-density polyethylene with MI=9 (HDPE; Run No. 7), or polypropylene with MI=1.5 (PP; Run No. 8) and precipitated barium sulfate in the amounts given in Table 2 were formed into a film and the film was made rough on its surface in the same manner as in Run No. 1. The resulting film was stretched at a stretching ratio of 2.0 times and thereafter was embossed under the thermal embossing condition given in Table 2 to obtain a porous film. Evaluations of the film thus-obtained are shown in Table 2. Determination of MI of polypropylene was carried out according to ASTM D-1238-79 (230° C., 2.160 kg load).

Run Nos. 9-10

In each run; L-LDPE and precipitated barium sulfate in the amounts given in Table 2 were treated in the same manner as in Run No. 1 to obtain a porous emboss film. Evaluations of the film thus-obtained are shown in Table 2.

Run No. 11

Treatments were connected in the same manner as in Run No. 1 except that the surface of the film was rendered rough by a rugged pattern in the transverse direction, thereby preparing a porous emboss film. Evaluations of the resulting film are shown in Table 2.

Run No. 12

Treatments were conducted in the same manner as in Run No. 1 except that the film was stretched at a stretching ratio of 4.5 times without being provided with satin pattern on its surface to obtain a porous film. Evaluations of the porous film are shown in Table 2.

Run No. 13

Treatments were conducted in the same manner as in Run No. 5 except that barium sulfate was used in place of calcium carbonate and the surface of the film was not rendered rough by satin pattern to obtain a porous film. Evaluations of the porous film are shown in Table 2.

Run Nos. 14-18

In each run; using the same L-LDPE as in Run No. 1 and an inorganic filler (precipitated barium sulfate; Run Nos. 14, 16, 17 and 18: calcium carbonate; Run No. 15) in the amounts given in Table 2, a porous emboss film was prepared in the same manner as in Run No. 1 and at the stretch ratio given in Table 2. Evaluations of the film thus-formed are shown in Table 2. In Run Nos. 14, 16 and 17, the film had practically no gas-permeability and was rigid. In Run Nos. 16 and 18, the film could not be prepared due to the breakage upon stretching.

Run Nos. 19–21

In each run; a porous emboss film was obtained in the same manner as in Run No. 1 except for the omission of the embossing for making the film surface rough prior to the stretching (Run No. 19), the omission of the embossing for making the film surface rough prior to the stretching and the thermal embossing subsequent to the stretching (Run No. 20), or the omission of the thermal embossing subsequent to the stretching (Run No. 21).

Evaluations of the resulting film are shown in Table 2. In Run Nos. 19 and 20, the film was poorlooking due to stretching irregularities and had dispersed moisture-permeability. In Run Nos. 20 and 21, the film showed a high rate of shrinkage and thus was rigid. In Run No. 21, the film had practically no ruggedness so that it was inferior in appearance.

Run No. 22

A porous film was obtained by annealing the stretched film in a hot air furnace without being provided with a rugged pattern on the surface of the stretched film. Evaluations of the porous film are shown in Table 2.

The porous film was imbalanced in its tensile strengths in the machine and transverse directions and was poor in its tear strength.

TABLE 2

| Run No. | Raw Material Resin (parts by weight) | Raw Material Inorganic Filler (parts by weight) | Pattern of Rough Surface Emboss Roll | Stretching Ratio (times) | Thermal Embossing Condition after Stretching Temperature (°C.) | Nip Pressure (Kg/cm) | Shrinkage by Heated Emboss Roll (area %) |
|---|---|---|---|---|---|---|---|
| 1 | L-LDPE 100 | BaSO$_4$ 150 | Satin | 2.0 | 90 | 15 | 20 |
| 2 | " | " | " | 1.2 | " | " | 0 |
| 3 | " | " | " | 7 × 7 | " | " | 40 |
| 4 | " | CaCO$_3$ 150 | " | 2.0 | " | " | 22 |
| 5 | " | " | " | 4 × 5 | " | " | 30 |
| 6 | L-LDPE 80 LDPE 20 | BaSO$_4$ 150 | " | 2.0 | " | " | 20 |
| 7 | HPPE 100 | BaSO$_4$ 180 | " | 2.0 | 100 | " | 14 |
| 8 | PP 100 | BaSO$_4$ 180 | " | 2.0 | 110 | " | 10 |
| 9 | L-LDPE 100 | BaSO$_4$ 60 | " | 2.0 | 90 | " | 20 |
| 10 | " | BaSO$_4$ 450 | " | 2.0 | " | " | 24 |
| 11 | " | BaSO$_4$ 150 | transverse stripe | 2.0 | " | " | 16 |
| 12 | " | " | — | 4.5 | " | " | 30 |
| 13 | " | " | — | 2 × 5(**) | " | " | 35 |
| 14 | " | " | satin | unstretched | " | " | 0 |
| 15 | " | CaCO$_3$ 150 | " | unstretched | " | " | 0 |
| 16 | " | BaSO$_4$ 150 | satin | 6 × 10 | " | " | — |
| 17 | " | BaSO$_4$ 40 | " | 2.0 | " | " | 20 |
| 18 | " | BaSO$_4$ 600 | " | 2.0 | " | " | — |
| 19 | " | BaSO$_4$ 150 | — | 2.0 | " | " | — |
| 20 | " | " | — | 2.0 | — | — | — |
| 21 | " | " | satin | 2.0 | — | — | — |
| 22 | " | " | — | 4.5 | — | — | — |

| Run No. | Depth of Rugged Pattern after stretching (μm) | Tensile Strength (Kg/25 mm) MD | Tensile Strength (Kg/25 mm) TD | Tear strength (g) | Water Vapor Permeability (g/m$^2$ · 24 hrs) | Stiffness (mm) | Shrinkage Rate (%) | Appearance (*) |
|---|---|---|---|---|---|---|---|---|
| 1 | 100 | 2.1 | 0.8 | 60 | 1400 | 150 | 10 | ◎ |
| 2 | 50 | 1.3 | 1.1 | 86 | 550 | 180 | 8 | ○ |
| 3 | 80 | 3.0 | 2.8 | 200 | 3500 | 110 | 15 | ◎ |
| 4 | 95 | 1.6 | 1.0 | 60 | 1550 | 162 | 11 | ◎ |
| 5 | 90 | 2.5 | 2.6 | 180 | 2000 | 130 | 12 | ◎ |
| 6 | 80 | 2.1 | 0.8 | 50 | 1200 | 153 | 10 | ◎ |
| 7 | 75 | 2.5 | 1.2 | 45 | 1400 | 178 | 7 | ◎ |
| 8 | 75 | 2.5 | 1.1 | 35 | 1450 | 175 | 5 | ◎ |
| 9 | 80 | 3.0 | 1.2 | 90 | 600 | 160 | 10 | ◎ |
| 10 | 90 | 1.6 | 0.9 | 60 | 1500 | 182 | 12 | ◎ |
| 11 | 100 | 2.2 | 1.8 | 100 | 1450 | 165 | 8 | ◎ |
| 12 | 100 | 3.5 | 0.8 | 8 | 2000 | 130 | 12 | ◎ |
| 13 | 110 | 2.0 | 3.0 | 160 | 2600 | 120 | 12 | ◎ |
| 14 | 55 | 1.2 | 1.2 | 88 | 30 | 200 | 2 | △ |
| 15 | 50 | 1.3 | 1.2 | 85 | 50 | 201 | 2 | △ |
| 16 | — | — | — | — | — | — | — | * |
| 17 | 60 | 3.0 | 2.0 | 80 | 50 | 180 | 12 | ○ |
| 18 | — | — | — | — | — | — | — | * |
| 19 | — | — | — | — | — | — | — | X |
| 20 | — | — | — | — | — | — | — | X |
| 21 | — | 2.0 | 0.8 | 48 | 1600 | 185 | 28 | △ |

TABLE 2-continued

| | | | | | | | | |
|---|---|---|---|---|---|---|---|---|
| 22 | — | 6.5 | 0.4 | 4 | 2600 | 125 | 40 | Δ |

(*)Appearance
⊚ very good
○ good
Δ poor
X bad (stretching irregularities)
*breakage upon stretching
(**) A TD extension is first conducted at a stretching ratio of 5 times.

EXAMPLE 3

Run Nos. 1–7

In each run; 100 parts by weight of linear low-density polyethylene (L-LDPE) with MI=2 and 150 parts by weight of precipitated barium sulfate (average particle size: 0.8 μm) as an inorganic filler were mixed in a Henschel mixer. The resulting mixture was pelletized and then formed into a film through extrusion by a T-die extruder. Thereafter, the film was applied on its surface with a striped rugged pattern perpendicularly to the flow direction of the film at the ruggedness depth ratio and interval given in Table 3. Thereafter, the resulting film was stretched in the flow direction of the film at the stretching ratio given in Table 3 to prepare a porous film with a grammage of 50 g/m². Evaluations of the film thus obtained are shown in Table 3.

Run Nos. 8–14

In each run; a mixture of the same L-LDPE as used in Run No. 1 and low-density polyethylene (LDPE) with MI=5 (Run No. 8), high-density polyethylene with MI=9 (HDPE, Run No. 9), polypropylene with MI=1.5 (PP; Run No. 10), or linear low-density polyethylene (L LDPE; Run Nos. 11–14) and precipitated barium sulfate (Run Nos. 8–12), calcium carbonate (average particle size: 0.8 μm, Run No. 13) or a mixture of precipitated barium sulfate and calcium carbonate (Run No. 14) in the amounts given in Table 3 were formed into a film in the same manner as in Run No. 1. The resulting film was applied on its surface a transverse striped rugged pattern and then stretched at a stretching ratio of 2.0 times to obtain a porous film. Evaluations of the film thus-obtained are shown in Table 3. Determination of MI of polypropylene was carried out according to ASTM-D 1238-79 (230° C., 2.160 kg load).

Run No. 15

Treatments were conducted in the same manner as in Run No. 1. The resulting film was further applied on its surface a rugged pattern, thereby preparing a porous film. Evaluations of the film thus-formed are shown in Table 3.

Run Nos. 16–21

In each run; a porous film was obtained in the same manner as in Run No. 1 except for the omission of the application of the transverse striped rugged pattern before the stretching (Run No. 16), or instead of this, the application of an ordinary satin pattern (Run No. 17) or the application of a transverse striped rugged pattern at the ruggedness depth ratio and interval given in Table 6 (Run Nos. 18–21). Evaluations of the resulting film are shown in Table 3. In Run Nos. 16, 18 and 21, the film was poor-looking due to stretching irregularities and had dispersed moisture-permeability. In Run Nos. 17 and 21, the film had poor tensile strength in the transverse direction and insufficient tear strength in the machine direction and was inferior in appearance. In Run No. 20, stable production of the film could not be attained on account of the breakage thereof upon stretching.

Run Nos. 22–25

In each run; the same L-LDPE as used in Run No. 1 and precipitated barium sulfate in the amounts given in Table 3 were treated in the same manner as in Run No. 1 and at the stretching ratio given in Table 3 to obtain a porous film. Evaluations of the resulting film are shown in Table 3. In Run Nos. 22 and 24, the film had degraded moisture-permeability, while in Run No. 23 it was inferior in tensile strength and tear strength. In Run No. 25, the film could not be produced stably owing to the breakage thereof upon stretching.

TABLE 3

| | Raw Material | | Rugged Pattern before stretching | | | Properties | | | | | | |
|---|---|---|---|---|---|---|---|---|---|---|---|---|
| | | | | | | Tensile strength (Kg/25 mm) | | Tear strength | Water Vapor Permeability | Coefficient of Static Friction | | Depth of Rugged Pattern after Stretching |
| Run No. | Resin (parts by weight) | Inorganic Filler (parts by weight) | Ruggedness Depth ratio | Interval (μm) | Stretching Ratio (times) | MD | TD | (g) | (g/m²· 24 hrs) | (tan θ) | Appearance(3) | (μm) |
| 1 | L-LDPE 100 | BaSO₄ 150 | 0.5 | 300 | 2.0 | 2.0 | 0.8 | 65 | 1700 | 0.5 | ⊚ | 30 |
| 2 | " | " | 0.2 | " | " | 1.9 | 0.7 | 45 | 1000 | 0.6 | ○ | 43 |
| 3 | " | " | 0.8 | " | " | 1.9 | 0.7 | 42 | 1500 | 0.4 | ⊚ | 15 |
| 4 | " | " | 0.5 | 80 | " | 2.0 | 0.7 | 33 | 1000 | 0.6 | ○ | 28 |
| 5 | " | " | " | 600 | " | 2.1 | 0.6 | 33 | 1400 | 0.5 | ⊚ | 33 |
| 6 | " | " | " | 300 | 1.2 | 1.3 | 1.0 | 100 | 550 | 0.6 | ○ | 27 |
| 7 | " | " | " | " | 4.0 | 2.8 | 0.6 | 20 | 2500 | 0.4 | ○ | 65 |
| 8 | L-LDPE 80 LDPE 20 | BaSO₄ 150 | " | " | 2.0 | 2.0 | 0.8 | 52 | 1300 | 0.5 | ⊚ | 30 |
| 9 | HDPE 100 | " | " | " | " | 2.4 | 0.9 | 45 | 1400 | 0.5 | ⊚ | 29 |
| 10 | PP 100 | " | " | " | " | 2.4 | 0.9 | 45 | 1450 | 0.5 | ⊚ | 28 |
| 11 | L-LDPE 100 | BaSO₄ 60 | " | " | " | 2.8 | 0.7 | 85 | 500 | 0.5 | ⊚ | 34 |
| 12 | " | BaSO₄ 450 | " | " | " | 1.7 | 0.7 | 40 | 1800 | 0.5 | ○ | 28 |
| 13 | " | CaCO₃ 150 | " | " | " | 1.7 | 0.8 | 58 | 1720 | 0.5 | ⊚ | 36 |
| 14 | " | BaSO₄ 100 | " | " | " | 1.9 | 0.8 | 60 | 1750 | 0.5 | ⊚ | 32 |

TABLE 3-continued

| Run No. | Raw Material Resin (parts by weight) | Inorganic Filler (parts by weight) | Rugged Pattern before stretching Ruggedness Depth ratio | Interval (μm) | Stretching Ratio (times) | Tensile strength (Kg/25 mm) MD | TD | Tear strength (g) MD | Water Vapor Permeability (g/m². 24 hrs) | Coefficient of Static Friction (tan θ) | Appearance[3] | Depth of Rugged Pattern after Stretching (μm) |
|---|---|---|---|---|---|---|---|---|---|---|---|---|
| 15 | " | CaCO₃ 50 BaSO₄ 150 | " | " | " | 2.1 | 1.0 | 80 | 1450 | 0.4 | ◎ | 80 |
| 16 | " | " | — | — | " | — | —[1] | — | — | — | X | — |
| 17 | " | " | 0.5 | —[2] | " | 2.0 | 0.8 | 45 | 1600 | 0.6 | Δ | 30 |
| 18 | " | " | 0.1 | 300 | " | — | —[1] | — | — | — | X | — |
| 19 | " | " | 0.95 | 300 | " | — | — | — | — | — | * | — |
| 20 | " | " | " | 40 | " | — | —[1] | — | 500–1800 | — | X | — |
| 21 | " | " | " | 2100 | " | 2.0 | 0.7 | 15 | 1000 | 0.7 | Δ | 35 |
| 22 | " | " | " | 300 | Un-stretched | 1.3 | 1.2 | 90 | 30 | 0.7 | Δ | |
| | | | | | | 25 | | | | | | |
| 23 | " | " | " | " | 7.0 | 2.9 | 0.6 | 20 | 3000 | 0.5 | Δ | 100 |
| 24 | " | BaSO₄ 40 | " | " | 2.0 | 3.0 | 2.2 | 82 | 50 | 0.5 | Δ | 36 |
| 25 | " | BaSO₄ 600 | " | " | " | — | — | — | — | — | * | — |

Note:
[1] Scattered due to increased stretching irregularities.
[2] Satin pattern on whole surface.
[3] Appearance
◎ very good
○ good
Δ poor
X bad (stretching irregularity)
* breakage upon stretching

EXAMPLE 4

Run Nos. 1–7

In each run; 100 parts by weight of linear low density polyethylene (L-LDPE) having MI=2 and a density of 0.920 and 150 parts by weight of precipitated barium sulfate (average particle size: 0.8 μm) as an inorganic filler were mixed in a Henschel mixer. The resulting mixture was pelletized and then formed into a film through extrusion by a T-die extruder. Subsequently, the film was applied on its surface with a striped rugged pattern in parallel with the flow direction of the film at the ruggedness depth ratio and interval given in Table 4. Thereafter, the resulting film was stretched uniaxially in the direction perpendicular to the flow direction of the film at the stretch ratio given in Table 4 to obtain a porous film with a grammage of 40 g/m². Physical properties of the resulting film are shown in Table 4. The density was measured according to ASTM D 792.

Run Nos. 8–14

In each run; a mixture of the same L-LDPE as used in Run No. 1 and low-density polyethylene (LDPE) having MI=5 and a density of 0.922 (Run No. 8), high-density polyethylene having MI=9 and a density of 0,950 (HDPE, Run No. 9), polypropylene having MI=1.5 and a density of 0.915 (PP, Run No. 10), or linear low-density polyethylene (L-LDPE, Run Nos. 11–14) and precipitated barium sulfate (Run Nos. 8–12), calcium carbonate (average particle size: 0.8 μm, Run No. 13) or a mixture of precipitated barium sulfate and calcium carbonate (Run No. 14) in the amounts given in Table 4 were formed into a film in the same manner as in Run No. 1. The film was applied on its surface a striped rugged pattern in the machine direction and stretched uniaxially in the transverse direction at a stretch ratio of 2.0 times, thereby obtaining a porous film. Evaluations of the resulting film are shown in Table 4. MI of PP was measured according to ASTM E 1238 (230° C., 2.160 kg load), while its density was determined in accordance with ASTM D 1505.

Run No. 15

Treatments were conducted in the same manner as in Run No. 4. The resulting film was applied on its surface a rugged pattern, thus obtaining a porous film. Evaluations of the resulting film are shown in Table 4.

Run Nos. 16–21

In each run; a porous film was obtained in the same manner as in Run No. 1 except for the omission of the application of the striped rugged pattern in the machine direction before the stretching (Run No. 16), or instead of this, the application of an ordinary satin pattern (Run No. 17) or the application of a striped rugged pattern in the flow direction at the ruggedness depth ratio and interval given in Table 4 (Run Nos. 18–21). Evaluations of the resulting film are shown in Table 4. In Run Nos. 16, 18 and 20, the film was poor-looking on account of stretching irregularities and had dispersed moisture-permeability. In Run Nos. 17 and 20, the film had poor tensile strength in the machine direction and was inferior in appearance. In Run No. 19, the film could not be produced stably on account of the breakage upon stretching.

Run Nos. 22–25

In each run; the same L-LDPE as used in Run No. 1 and precipitated barium sulfate in the amounts given in Table 4 were treated in the same manner as in Run No. 1 at the stretch ratio given in Table 4 to obtain a porous film. Evaluations of the resulting film are shown in Table 4. The film had degraded moisture-permeability in Run Nos. 22 and 24, while in Run No. 23 it was inferior in tensile strength. Run No. 25 failed in stable production of the film due to the breakage upon stretching.

TABLE 4

| Run No. | Raw Material Resin (parts by weight) | Raw Material Inorganic Filler (parts by weight) | Rugged Pattern (before stretching) Ruggedness Depth ratio | Rugged Pattern (before stretching) Interval (μm) | Stretching Ratio (times) | Properties Tensile strength (Kg/25 mm) MD | Properties Tensile strength (Kg/25 mm) TD | Properties Tear strength (g) MD | Properties Tear strength (g) TD | Properties Water Vapor Permeability g/m²·24 hrs | Properties Coefficient of Static Friction (tan θ) | Appearance[3] | Depth of Rugged Pattern after Stretching (μm) |
|---|---|---|---|---|---|---|---|---|---|---|---|---|---|
| 1 | L-LDPE 100 | BaSO₄ 150 | 0.5 | 300 | 2.0 | 0.9 | 2.0 | 80 | 70 | 1700 | 0.5 | ◎ | 25 |
| 2 | " | " | 0.2 | " | " | 1.1 | 2.0 | 72 | 74 | 1500 | 0.4 | ◎ | 14 |
| 3 | " | " | 0.8 | " | " | 0.8 | 1.9 | 77 | 72 | 2000 | 0.6 | O | 37 |
| 4 | " | " | 0.5 | 80 | " | 0.8 | 2.0 | 73 | 70 | 1000 | 0.6 | O | 25 |
| 5 | " | " | " | 600 | " | 0.7 | 2.1 | 67 | 65 | 1400 | 0.5 | ◎ | 26 |
| 6 | " | " | " | 300 | 1.2 | 1.1 | 1.3 | 94 | 83 | 550 | 0.6 | O | 14 |
| 7 | " | " | " | " | 4.0 | 0.7 | 2.8 | 65 | 62 | 2500 | 0.4 | O | 65 |
| 8 | L-LDPE 80 | BaSO₄ 150 | " | " | 2.0 | 0.9 | 2.0 | 78 | 75 | 1300 | 0.5 | ◎ | 25 |
| 9 | HDPE 100 | " | " | " | " | 1.0 | 2.4 | 72 | 67 | 1400 | 0.5 | ◎ | 24 |
| 10 | PP 100 | " | " | " | " | 1.0 | 2.4 | 85 | 77 | 1450 | 0.5 | ◎ | 23 |
| 11 | L-LDPE 100 | BaSO₄ 60 | " | " | " | 0.8 | 2.8 | 96 | 85 | 500 | 0.5 | ◎ | 28 |
| 12 | " | BaSO₄ 450 | " | " | " | 0.8 | 1.3 | 62 | 60 | 2000 | 0.5 | O | 20 |
| 13 | " | CaCO₃ 150 | " | " | " | 0.9 | 1.4 | 78 | 70 | 1720 | 0.5 | ◎ | 28 |
| 14 | " | BaSO₄ 100 CaCO₃ 50 | " | " | " | 0.9 | 1.9 | 79 | 72 | 1750 | 0.5 | ◎ | 27 |
| 15 | " | BaSO₄ 150 | " | " | " | 1.1 | 2.1 | 92 | 80 | 1450 | 0.4 | ◎ | 80 |
| 16 | " | " | — | — | 2.0 | — | — | — | — | — | —(1) | X | — |
| 17 | " | " | 0.5 | —(2) | 2.0 | 0.9 | 1.9 | 83 | 58 | 1600 | 0.6 | Δ | 25 |
| 18 | " | " | 0.1 | 300 | " | — | — | — | — | — | —(1) | X | — |
| 19 | " | " | 0.95 | 300 | " | — | — | — | — | — | — | * | — |
| 20 | " | " | 0.5 | 40 | " | — | — | — | — | — | —(2) | X | — |
| 21 | " | " | " | 2100 | " | 0.9 | 2.0 | 65 | 62 | 1000 | 0.7 | Δ | 27 |
| 22 | " | " | " | 300 | Un-stretched | 1.3 | 1.1 | 118 | 100 | 30 | 0.7 | Δ | 22 |
| 23 | " | " | " | " | 7.0 | 0.7 | 2.8 | 120 | 55 | 3000 | 0.5 | Δ | 100 |
| 24 | " | BaSO₄ 40 | " | " | 2.0 | 0.7 | 3.2 | 97 | 90 | 50 | 0.5 | Δ | 33 |
| 25 | " | BaSO₄ 600 | " | " | " | — | — | — | — | — | — | * | — |

Note:
(1)Measurements of properties except for "appearance" were not made due to partial stretching in Run Nos. 16, 19 and 20.
(2)Satin pattern on whole surface.
(3)Appearance
◎ very good
O good
Δ poor
X bad (stretching irregularities)
*breakage upon stretching

What is claimed is:

1. In a process for preparing a gas-permeable, porous film, which comprises the steps of (a) mixing a polyolefin resin and an inorganic filler, (b) forming a film from the mixture and (c) stretching the resulting film to form the porous film, the improvement consisting of a first embossing of said film prior to stretching it, so as to produce only a rough surface thereon; and a second embossing of the stretched film, so as to produce a distinct rugged pattern on said film having peaks and valleys with a surface depth of from 2 microns to 3 millimeters.

2. In a process for preparing a ga-permeable, porous film, which comprises the steps of (a) mixing a polyolefin resin and an inorganic filler, (b) forming a film from the mixture and (c) stretching the resulting film to form the porous film, the improvement consisting of a first embossing of said film prior to stretching it, so as to produce only a rough surface thereon; and a second embossing of the stretched film with rollers heated at a temperature of between 40 degrees C. below and 20 degrees C. above the melting temperature of the polyolefin resin, so as to produce a distinct rugged pattern on said film having peaks and valleys with a surface depth of from 2 microns to 3 millimeters.

3. The process according to claim 2, wherein said second embossing is effected while simultaneously allowing the film to shrink area-wise by 5–50 percent, said stretching being effected at a stretching ratio, on area basis, of 4–25.

4. The process according to claim 2, wherein said film is restretched prior to said second embossing at a stretching ratio, on area basis, of at least 1.03.

* * * * *